United States Patent [19]
Nyman

[11] 3,817,556
[45] June 18, 1974

[54] MOTORCYCLE TRAILER
[76] Inventor: Bengt E. Nyman, 5514 S. Crow's Nest Rd., Tempe, Ariz. 85283
[22] Filed: Feb. 12, 1973
[21] Appl. No.: 331,665

[52] U.S. Cl. ............................................. 280/400
[51] Int. Cl. ......................................... B62d 53/00
[58] Field of Search .......... 280/400, 402, 414, 292, 280/106 T; 214/505, 506

[56] References Cited
UNITED STATES PATENTS

| | | | |
|---|---|---|---|
| 2,219,401 | 10/1940 | Sampsell ..................... | 280/414 R X |
| 2,610,865 | 9/1952 | Cantrell ...................... | 280/414 R X |
| 2,660,443 | 11/1953 | Miller .......................... | 280/414 R X |
| 2,661,108 | 12/1953 | Horn et al. .................. | 280/414 R X |
| 2,998,382 | 6/1961 | Holland ............................ | 280/400 |
| 3,025,985 | 3/1962 | Crawford ..................... | 280/400 UX |
| 3,458,073 | 7/1969 | Dawson ........................ | 280/402 UX |
| 3,625,545 | 12/1971 | Somers et al. ...................... | 280/400 |

FOREIGN PATENTS OR APPLICATIONS

| | | | |
|---|---|---|---|
| 659,980 | 3/1963 | Canada .............................. | 280/400 |

*Primary Examiner*—Leo Friaglia
*Attorney, Agent, or Firm*—Cahill, Sutton & Thomas

[57] ABSTRACT

A readily dismantleable rigid motorcycle trailer is disclosed. Each of a plurality of upwardly oriented U-shaped channels, in combination with crossmembers, form the body of the trailer. The channels and crossmembers are secured to one another by nuts and bolts exclusively and define a plurality of overlapping triangles to provide a rigid body without additional structural members. A swing arm suspension system provides high ground clearance while maintaining a low center of gravity.

10 Claims, 4 Drawing Figures

MOTORCYCLE TRAILER

The present invention relates to trailers, and, more particularly, to lightweight dismantleable trailers for transporting motorcycles.

With the increasing use of motorcycles for recreational purposes, the demand for some type of a vehicle, which vehicle may be used to transport the motorcycles from the place of storage to the place of use has increased concurrently. Most of the initial attempts to satisfy the demand generated a plurality of flatbed trailers adapted to receive motorcycles. These trailers were generally of welded construction with or without a sheet of metal braced by a frame made of beams or tubing. A solid axle secured to the frame by leaf springs were used. These trailers suffered from several disadvantages. First, they were relatively heavy, hard to handle, and generally unsuitable for trailering behind low-powered cars. Second, the suspension performance and ground clearance was usually limited to something less than that of the car, which prevented their use on otherwise passable roads. Third, storage of the trailer for an extended period of time was awkward and costly in terms of space as the trailer could not be dismantled. Fourth, the nature of the construction of the trailer forced the manufacturer to assemble it, or the frame of it, en toto and then deliver it to the purchaser. The high freight cost attendant such delivery limited distribution and shipment of the trailer to points close to the manufacturer.

In order to overcome the weight problems associated with flatbed trailers, there have developed several different types of fiberglass trailers. These trailers are generally of much lighter weight than the conventional trailers; however, they suffer from some of the other disadvantages. Namely: the nature of the process for producing the fiberglass trailers requires that they be assembled en toto at the point of manufacture; the problems attendant the shipment of a bulky article are present; and, storage problems during extended periods of trailer nonuse are not overcome.

Yet another approach to overcoming the above enumerated disadvantages of the prior art includes the manufacture of a motorcycle trailer in the form of an unclad framework. Of the presently known ones of this type, all of them have their components arranged in a rectilinear manner. Thus, the rigidity of the trailer is mainly dependent upon the inherent strength of the individual members and the means by which the members are secured to one another rather than upon the geometric configuration of the trailer itself.

It is therefore, a primary object of the present invention to provide a lightweight, inherently rigid motorcycle trailer.

Another object of the present invention is to provide a dismantleable motorcycle trailer.

Yet another object of the present invention is to provide a motorcycle trailer having its components connected to one another in a rigid geometric configuration.

A further object of the present invention is to provide a motorcycle trailer having its major components secured to one another by a plurality of nuts and bolts exclusively.

A yet further object of the present invention is to provide a motorcycle trailer having a high ground clearance.

These and other objects of the present invention will become readily apparent to those skilled in the art as the description thereof proceeds.

The present invention may be described with more specificity and clarity with reference to the following drawings, in which.

Figure 1:
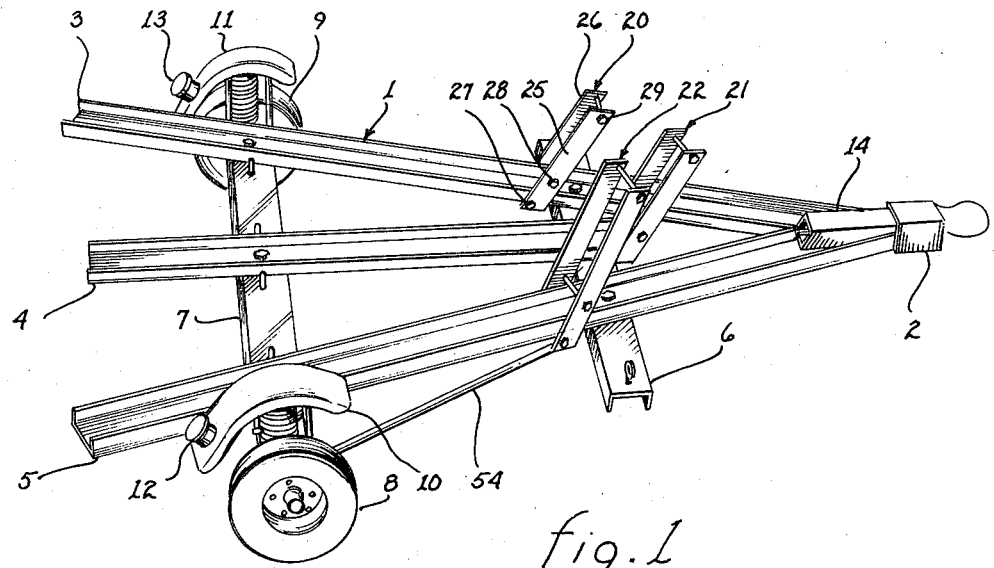
FIG. 1 is an isometric view of a trailer constructed in accordance with the principles of the present invention.

Referring in FIG. 1, there is shown a trailer 1 constructed in accordance with the present invention, capable of transporting three motorcycles. The front end of trailer 1 is secured to the towing vehicle by a conventional latch mechanism 2, which mechanism includes a socket for engagement with a ball mounted on the towing vehicle. The body of the trailer is formed by a plurality of upwardly oriented, U-shaped channels 3, 4, and 5 interconnected by a pair of cross-members 6 and 7. The cross-members are downwardly oriented, U-shaped channels. These parts may be of standard size aluminum alloy extrusions, thereby eliminating the need and expense of specially produced framework parts. If the aluminum alloy is such as that known in the trade as 6061-T6, the parts are corrosion resistant, tempered and require no surface treatment. Again, the cost of the trailer has been further reduced by eliminating finishing.

The front end of the two outer channels 3 and 5 are abutted to one another at an acute angle by cutting the channels at an angle. A part 14 is secured to the base of each of the channels by a plurality of nut and bolt combinations 15. The latch mechanism 2 may also be secured to part 14. A crossmember 6, of material similar to that of the channels, is bolted to each of channels 3 and 5. The positional arrangement of crossmember 6 is such that it is normal to an imaginary line bisecting the angle formed by channels 3 and 5. A second crossmember 7, parallel to crossmember 6, is also bolted to channels 3 and 5. By this arrangement, each of the crossmembers in combination with channels 3 and 4 forms an isosceles triangle with one triangle being coincident with the upper part of the other triangle. Hence, the structure defined by channels 3 and 5 are crossmembers 6 and 7 is inherently rigid and is not dependent upon the holding power of the nut and bolt combinations to obtain rigidity.

Figure 2:
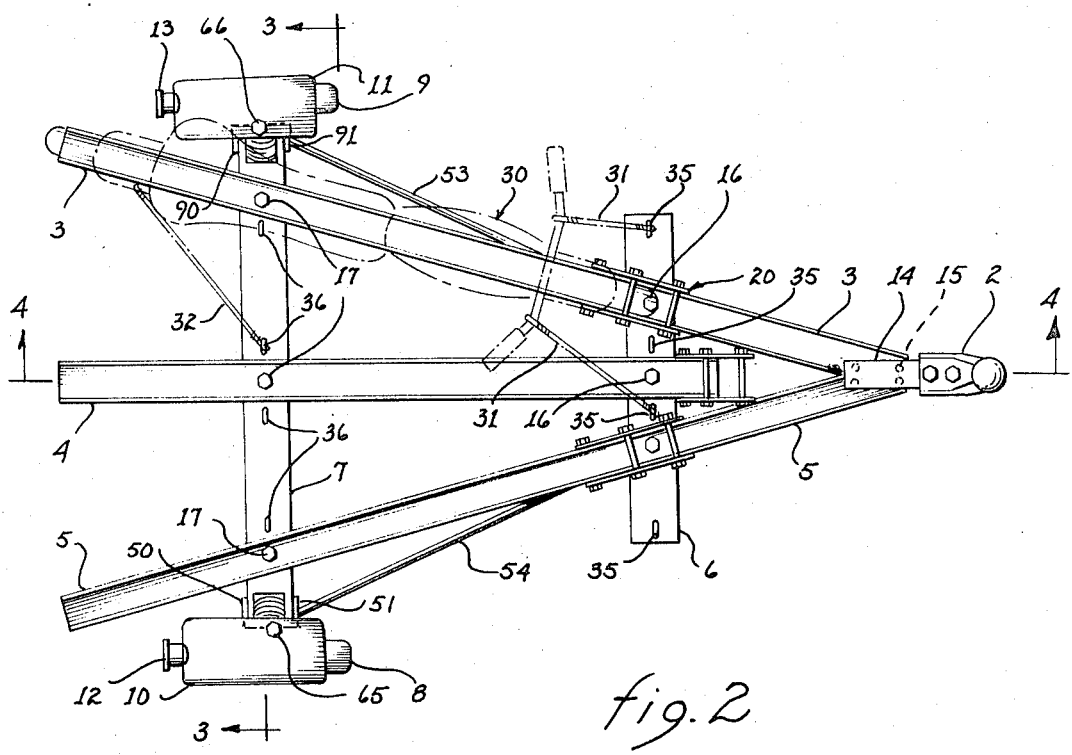
FIG. 2 is a top view of the present invention, including the illustration of a motorcycle mounted thereon.

A third U-shaped channel 4 is secured to each of crossmembers 6 and 7 equidistant from the respective points of attachment of channels 3 and 5. Referring momentarily to FIG. 2, it may be seen that the outline formed by channel 4, cross-members 6 and 7 and channels 3 and 5 is that of two back-to-back truncated right angle triangles. This configuration, because of the nonparallelism between two matching sides, is inherently rigid. It is not dependent upon high friction or mechanical interlock at the points of attachment of the members. Thus, the framework defined by channels 3, 4, and 5 and cross-members 6 and 7 cannot be displaced without a shearing of the attaching bolts or a buckling of one of the members. By careful selection of the aluminum alloy, such as the aluminum alloy identified previously, and the use of half-inch steel bolts, all expected loads can be accommodated without deformation of the trailer body.

A pair of wheels 8 and 9, through their respective suspension systems, are secured to cross-member 7. Mud guards 10 and 11, with attached tail lights 12 and 13, respectively, are secured to cross-member 7 by a simple bracket arrangement. The details of the suspension system will be discussed in greater detail below.

Guards 20, 21, and 22 are secured to each of channels 3, 4, and 5, respectively. Each of these guards receives the front wheel of one of the motorcycles and delimits the forwardmost position of each motorcycle. In addition, each one supports the motorcycle in a vertical position. The configuration of the guards may be described as follows with particular reference to guard 20. A pair of straps 25 and 26 are disposed on either side of channel 3. A bolt 27 engages each of the straps beneath channel 3. Another bolt 28 engages each of the straps above channel 3 with the spacing therebetween being somewhat greater than the height of the channel. The spacing between bolts 27 and 28 permits guard 20 to be tilted forwardly until bolt 27 contacts the lower part of the channel and bolt 28 contacts the edge of the channel flanges. Guard 20 is purposely not positionally secured to channel 3 to permit the guard to be moved forwardly or rearwardly to accommodate motorcycles of varying lengths. Once the position of guard 20 has been determined, the nuts engaging bolts 27 and 28 are tightened until there is a tight frictional fit between guard 20 and channel 3. Bolt 29 and its nut are tightened to tie the extremities of the straps 25 and 26 to one another. The width between the straps is controlled by the width of channel 3 but may be somewhat modified by the degree to which bolt 29 is tightened. Thus, unusually thin or unusually wide motorcycle tires can be accommodated by the guard.

Referring to FIG. 2, there is shown a motorcycle 30 having its wheels positioned within channel 3 and the front wheel also disposed within guard 20. The lateral movement of the motorcycle 30 is prevented by the flanges of channel 3 acting against the sides of the tires. The forward movement is prevented by bracket 20. The rearward movement may be prevented by one or more tie lines 31, 32, connected between motorcycle 30 and one of eye bolts 35, 36, respectively. The tie lines, in combination with bracket 20, will also prevent the motorcycle from tipping sideways. Additional eye bolts 35 on cross-member 6 and eye bolts 36 on cross-member 7 are also shown.

FIG. 2 also dramatically illustrates the simplicity of the interconnection between the channels 3, 4, and 5 and cross-members 6 and 7. Only one of bolts 16 secures one of the channels to crossmember 6 and only one of bolts 17 secures one of the channels to crossmember 7.

Figure 3:
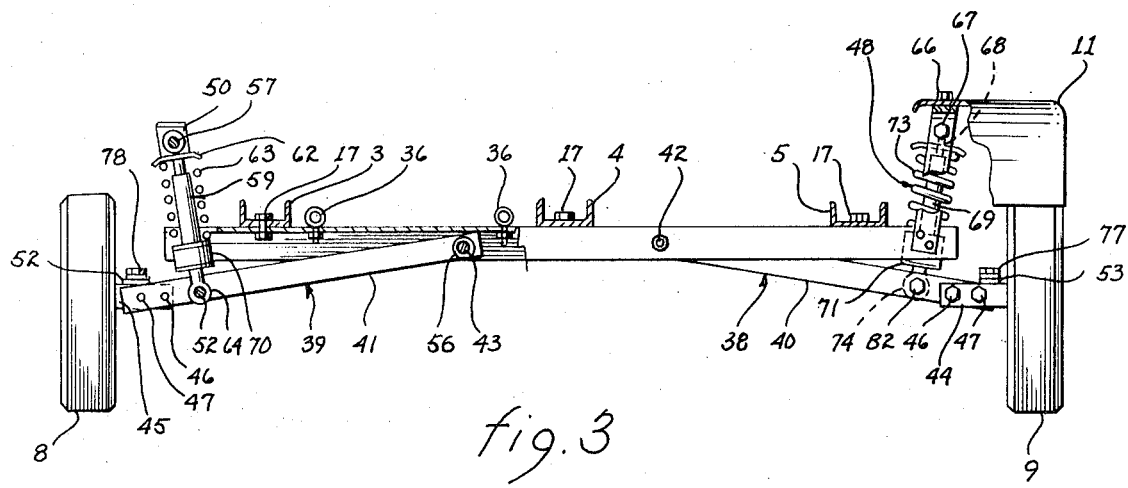
FIG. 3 is a cross-sectional view of the present invention, taken along lines 3—3, as shown in FIG. 2.
Figure 4:
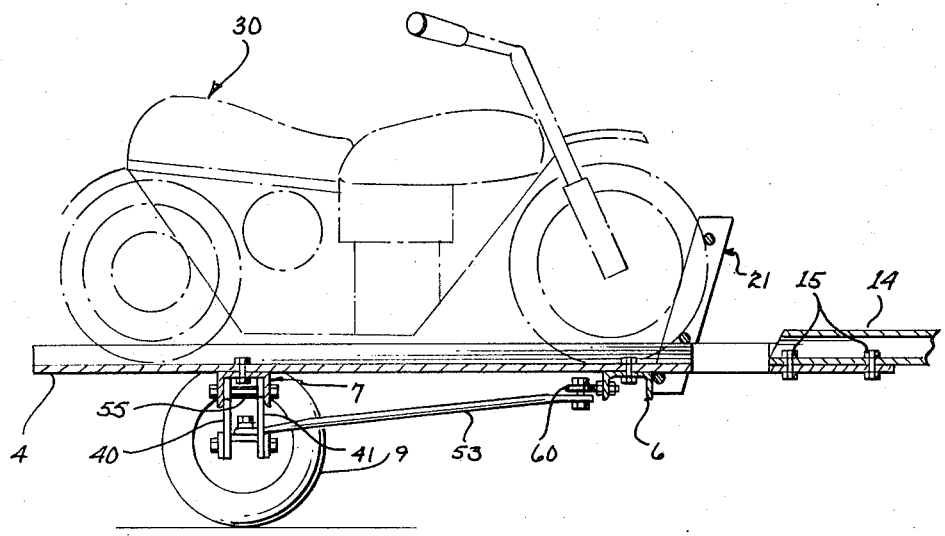
FIG. 4 is a cross-sectional view of the present invention, taken along lines 4—4, as shown in FIG. 2.

Referring jointly to FIGS. 3 and 4, there is shown the swing arm suspension system of the present invention. Each of the arms includes a pair of elongated plates 40 and 41. These plates are secured between the flanges of crossmember 7 by bolts 42 and 43. Spacers 55, 56 may be disposed about the bolt intermediate each pair of plates 40 and 41 to maintain them in a spaced relationship. At the other end of each of the pair of plates, a spindle assembly 44 or 45 is bolted to the pair of plates by a pair of bolts 46, 47. The hub of wheels 9 and 8 are attached to spindle assemblies 44 and 45, respectively, by conventional means. With this arrangement, swing arm 38 pivots about bolt 42 and swing arm 39 pivots about bolt 43.

The pivotal movement of swing arm 38 and 39 is limited by a shock absorber and coil spring assembly 48 and 49, respectively, mounted intermediate crossmember 7 and the respective swing arm. The ends of the base of crossmember 7 has been removed to permit the assemblies 48 and 49 to be positioned between the flanges of the crossmember. A pair of straps 50 and 51 is secured to each end of the flanges of crossmember 7 (see also FIG. 2) and extends upwardly therefrom. The eyelet of the piston rod 58 of the shock absorber 59 is through the horizontal bolt 57 attached to each of the pairs of straps 50, 51 (see FIG. 3). A cylindrical plate 62 is positioned intermediate member 57 and the upper end of the coil spring 63. Thereby, the upward movement of the coil spring is limited. The eyelet 64 extending from the shock absorber cylinder is secured to each of arms 38 and 39 by bolts 52. The downward movement of coil spring 63 is limited by the lower end of the coil spring resting upon a seat therefore attached to the shock absorber. From this description, it may be understood that the upward pivoting of arms 38 and 39 is restricted by compression of the respective coil springs. Further, both the upward and downward pivoting of arms 38 and 39 are damped by the respective shock absorbers.

Longitudinal stability for arms 38 and 39 are provided by longitudinal stabilizing rods 53 and 54. One end of each of these rods is secured to crossmember 6 by means of a swivel joint 60 bolted to the crossmember. The other end of each of the stabilizing rods 53 and 54 rigidly connected by means of point 61 to respective spindle assemblies 45 and 46.

The vertically oriented plates of arms 38 and 39 effectively inhibit buckling of the arms due to vertical loads. The stabilizing rods 53 and 54 effectively prevent horizontal movement of arms 38 and 39 without impeding the pivoting capability of the arms. Thus, wheels 8 and 9 will track true despite heavy loads and rough terrain.

As can be seen from FIG. 3, the clearance available from a trailer constructed in accordance with the teachings of the present invention is substantially greater than the radius of the wheels being used. It is therefore highly unlikely that the trailer structure will drag if the towing vehicle can clear the obstacles.

From the above description of the interfitting of the various parts and components of the present invention, it may be readily understood that each piece or each component can be readily detached from the trailer by simply unscrewing one or more bolts. There are no welded joints nor any other joints which cannot be made or taken apart by simple readily available handtools. For this reason, the trailer can be readily shipped as a compact package for assembly by the recipient. Further, the trailer can be assembled when desired and disassembled for periods of prolonged nonuse at a considerable savings in storage space.

While the principles of the invention have now been made clear in an illustrative embodiment, there will be immediately obvious to those skilled in the art many modifications of structure, arrangement, portions, the elements, materials, and components, used in the practice of the invention which are particularly adapted for specific environments and operating requirements without departing from those principles.

I claim:

1. A lightweight rigid motorcycle trailer for transporting motorcycles, said trailer comprising:
   A. a plurality of upwardly oriented U-shaped channel members disposed in a common plane, each of said members converging toward one another in a non-parallel relationship and each of said members being adapted to receive the tires of a motorcycle;
   B. at least one crossmember, said crossmember being transversely disposed with respect to said members; and
   C. securing means disposed at each junction formed by said members and said one or more crossmembers for attaching said members to said crossmembers, said securing means being non-permanent, whereby the angular orientation of said members and said crossmember define at least one triangle, which triangle represents an inherently rigid geometrical figure and prevents relative movement between said members and crossmembers.

2. The trailer as set forth in claim 1, wherein the channel of each of said crossmembers is downwardly oriented, whereby the bases of said members are positioned adjacent the base of said crossmember.

3. The trailer as set forth in claim 2, wherein said securing means comprises a single nut and bolt combination.

4. The trailer as set forth in claim 3, wherein said members and said crossmember are of extruded aluminum and said bolts are of steel.

5. The trailer as set forth in claim 1, including a bracket in frictional engagement with each of said members, said bracket engaging one wheel of the motorcycle and limiting the movement of the motorcycle along the respective one of said members.

6. The trailer as set forth in claim 5, wherein each said bracket comprises:
   A. a pair of plates, each plate of said pair being disposed adjacent opposite outer sides of the flanges of the respective one of said members;
   B. a first and second nut and bolt combination connecting each plate of said pair of plates to one another, said first and second nut and bolt combinations being disposed on either side of each of said members; and
   C. a third nut and bolt combination connecting the extremities of each plate of said pair of plates.

7. The trailer as set forth in claim 1, wherein
   A. two of said members are secured to one another at an acute angle; and
   B. each said crossmember is positioned normal to a line bisecting the acute angle.

8. The trailer as set forth in claim 7, including at least two crossmembers, each of said crossmembers being parallel to one another.

9. The trailer as set forth in claim 8, including a third member, said member intersecting each of said crossmembers on the line bisecting the acute angle.

10. The trailer as set forth in claim 1 including a suspension system, said suspension system comprising a swing arm suspension having longitudinal stabilizing rods.

* * * * *